3,033,693
INFRARED TRANSMITTING AND ABSORBING GLASSES

Edward Carnall, Jr., Le Roy S. Ladd, Donald S. Cary, and William F. Parsons, Rochester, N.Y., assignors to Eastman Kodak Company, Rochester, N.Y., a corporation of New Jersey
No Drawing. Filed Dec. 10, 1954, Ser. No. 474,590
5 Claims. (Cl. 106—47)

This invention relates to glasses which have desirable transmission characteristics in the infrared spectrum, as well as good thermal stability and aging characteristics and desirable indices of refraction. Such glasses may be advantageously employed in the optical field, in lenses, flats, prisms, filters, wedges, and so forth. More specifically, this invention relates to novel selenium glass composition and to methods for making such selenium glass compositions.

As is well known, selenium, arsenic trisulfide, and arsenic triselenide glasses are among the common glasses now employed for infrared transmission. However, each has undesirable limitations; namely, selenium tends to crystallize when subjected to temperatures of 60–70° C., and flat surfaces distort at 35° C. Selenium does, however, possess good transmission (60–70%) in the infrared range of 0 to 21 microns, the loss being due to reflection, and would be more suitable for infrared applications if the crystallization tendencies were controllable. Arsenic trisulfide and arsenic triselenide glasses are, on the contrary, thermally more stable than selenium. However, arsenic trisulfide has a relatively low transmission in the 8 to 12 micron range, and arsenic triselenide has an absorption band between 12 and 13 microns, and as compared to selenium are, therefore, less desirable in many instances. It is also noted that arsenic triselenide glass is not commercially available.

An object, therefore, of the present invention is to provide improved selenium glass compositions which have improved thermal stability.

An additional object is to provide a glass which can be readily fabricated by molding techniques.

Still another object is to provide such selenium glass compositions having desirable indices of refraction.

Another object is to provide a material which has insignificant chemical interaction with lead sulfide detectors when in contact with them.

Yet, another object is to provide selenium glass compositions of predetermined transmission characteristics.

In accordance with our invention, these and other objects can be attained by preparing selenium glass compositions containing in addition to pure selenium, one or more of the following elements or compounds: As, $As_2S_3$, $As_2Se_3$, $As_2Te_3$, Te, $TeSe_2$, P, $P_2S_5$, $P_4Se$, $P_2Se$, $P_4Se_3$, $P_2Se_3$, $P_2Se_5$, $Tl_2Te_3$, $Tl_2Se_3$ and S. By varying the concentration of these additives, selenium glasses having desirable predetermined transmission characteristics, indices of refraction, softening points, brittleness and stability can be made. Many of the glasses prepared in accordance with this invention, are stable when exposed to the temperature extremes (70° C. to −54° C.) which are specified for much optical equipment and show no loss in transmission or tendency toward crystallization when subjected to 70° C. temperatures.

We have found in accordance with our invention that crystallization of selenium glass is very effectively inhibited by the addition of elemental phosphorus and arsenic, and also by the various phosphorus sulfide, phosphorus selenide, arsenic sulfide, and arsenic selenide compounds. In order to prevent amorphous selenium from crystallizing, we have found it is necessary to prevent the selenium atoms from reorienting themselves. The crystalline state of selenium is a lower energy state than the vitreous state and additional materials are necessary to prevent crystallization. The velocity of crystallization is determined by two factors, namely, by the frequency at which crystal nuclei are formed as measured by the number of nuclei formed in unit time, and by the rate of growth of these crystal nuclei, both factors being dependent on the temperature. Selenium may be considered as being a linear polymer having a molecular weight per unit chain of about 500–800. The selenium chain accordingly can be illustrated as:

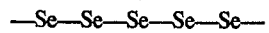

Actually, however, the selenium atoms are held together by overlapping wave functions or orbitals. Energy requirements and bond angles dictate that the atoms must spiral about a common axis, i.e., the Z axis (Cartesian coordinates). Every third atom will be displaced along the Z axis but have the same XY coordinates.

This chain is, therefore, very symmetrical and, therefore, crystallization can occur easily. While the selenium atoms in the chain are bonded by covalent bonds, different chains are cross-linked by a combination of weak Van der Waal and metallic bonds. Therefore, at relatively low temperatures, these weak bonds between chains break and allow a reorientation to the crystal state.

In accordance with our present invention, when the aforementioned additional elements and/or compounds are added to selenium, these chains are cross-linked so that they are covalently bonded together.

An example is selenium modified with arsenic which may be written:

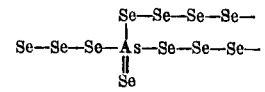

The cross-linking power of arsenic metal, for example, occurs when 7.4% $Tl_2Te_3$ is added to 92.6% Se, but the melt is crystalline and, hence, not desirable as optical glass. However, when 8% $Tl_2Te_3$ is added to 8% As and 84% Se, the melt is glassy and stable. We have also found that the cross-linking agents raise the softening point of the selenium glass, as is shown in the following data.

| Compositions: | Softening point, ° C. |
|---|---|
| Pure Se | 35 |
| 3.87 As–96.13% Se | 57 |
| 7.94 As–92.06% Se | 79 |

The softening points were determined by finding the temperature at which the number of Newton rings on the optical surface of a lens composed of selenium-arsenic glass changed after 10 hours.

It is desirable to modify the transmission characteristics of glasses, by making suitable use of absorption edges. The absorption edge is defined as the spectral point or wave length at which the absorption of the particular glass suddenly decreases. The occurrence of absorption edges in glass is explained by several different theories but all the theories involve the absorption of a photon of energy ($h\nu$) as a result of which an electron is raised to a higher energy level. This may be demonstrated in the case of radiation incident upon a PbTe glass. As the wave length increases, a point is reached at which there is insufficient energy ($h\nu$) to transfer an electron from $Te^{--}$ to $Pb^{++}$ ions and at this wave length the glass suddenly becomes substantially nonabsorbing.

In accordance with our invention we have found that the absorption edge of selenium glass compositions can be changed to longer wave lengths by the addition of tellurium metal, arsenic metal, arsenic tritelluride, arsenic trisulfide, arsenic triselenide, thallium and certain thallium compounds mentioned hereinafter.

We have made glasses of 47% Te—47% Se—6% As which have an absorption edge at about 1.3 microns. By varying the tellurium concentration in this melt, the absorption edge can be located as described hereinafter in the examples.

We have also found that the index of refraction of selenium glasses, made in accordance with our invention, can be advantageously varied by the addition of arsenic metal and its compounds or tellurium and its compounds to the selenium melt. For pure selenium the index of refraction varies between 2.42 and 2.38 from 5 to 15 microns. The following data illustrates the variations of indices of refraction possible of attainment by incorporating As and Te in the Se melt:

TABLE OF REFRACTIVE INDICES

[Composition: 92.1% Se, As 7.9%]

| Microns | 2 | 4 | 6 | 8 | 10 | 12 |
|---|---|---|---|---|---|---|
| N | 2.51 | 2.50 | 2.46 | 2.43 | 2.42 | 2.41 |

[Composition: 90.3% Se, 9.7% As]

| Microns | 2 | 4 | 6 | 8 | 10 | 12 |
|---|---|---|---|---|---|---|
| N | 2.61 | 2.57 | 2.54 | 2.50 | 2.48 | 2.46 |

[Composition: Se 47%, Te 47%, As 6%]

| Microns | 2 | 4 | 6 | 8 | 10 | 12 | 13 | 14 | 15 |
|---|---|---|---|---|---|---|---|---|---|
| N | 2.80 | 2.74 | 2.78 | 2.76 | 2.76 | 2.79 | 2.85 | 2.87 | 3.09 |

The indices of refraction given herein are only approximate because of the low sensitivity of the reflection technique used in their determination.

In accordance with another feature of our invention, we have found that in addition to glasses which have good transmission characteristics in the infrared spectrum, glasses which will be highly absorbing from 0.5 to 15 microns in two millimeter thicknesses, can be formed. We have made such highly absorbing glasses by the addition of PbTe—As, Tl—$As_2Se_3$, $Tl_2As$ and TlAs to selenium. The absorption of this selenium glass will be dependent upon the concentration of the additives. These particular glasses are of considerable interest because the absorption of energy in very close proximity to certain infrared detectors is of fundamental importance.

The softening point of any selenium glass is dependent upon the concentration of addition compounds.

This invention is further illustrated in the following examples.

Example 1

92.06 grams of pure selenium are added to 7.94 grams of pure arsenic metal. The mixture is refluxed under a vacuum of about 10 millimeters Hg until the melt is homogeneous. The melt was cast in the form of a rough lens which was polished. The lens did not warp until it was heated to 79° C. The transmission of the glass did not decrease when it was heated at 70° C. for 103 hours. The index of refraction of this glass at 2 microns is 2.51.

Example 2

47.8 grams of pure selenium, 47.8 grams of distilled tellurium and 4.4 grams of pure arsenic metal were heated together with stirring. When the melt was homogeneous, a vacuum of about 10 millimeters was applied to remove any entrapped gas in the melt. The melt was poured into a tube of desired diameter. The tube was removed and the selenium-tellurium-arsenic rod ("preform") was ready for pressing. The "preform" was placed in a stainless steel mold at 100° C. and pressed to the desired shape and cooled. The optic so formed has surfaces of good optical quality. The softening point of this glass is 75° C., and it was heated at 70° C. for 105 hours without any change in transmission. The index of refraction of this glass at 2 microns is 2.80.

Example 3

40 grams of pure selenium, 50 grams of pure tellurium, 5 grams of pure arsenic and 5 grams of pure sulfur were melted with agitation and then subjected to a vacuum of several millimeters. The melt was made into a preform and pressed into a lens as in Example 2.

Example 4

51.00 grams of pure selenium were melted with 4.0 grams of pure phosphorus pentaselenide. The melt was refluxed under a vacuum of several millimeters and made into a preform. The cooled glass was made into a flat as in Example 2.

Example 5

47 grams pure selenium, 47 grams pure tellurium, 6 grams of distilled phosphorus were melted and refluxed under vacuum. The melt was poured into a mold and the lens blank polished into the desired shape.

Example 6

95.00 grams of pure selenium were melted and refluxed with 5.00 grams of pure arsenic trisulfide under vacuum of a few millimeters and made into a preform. The cooled glass was made into a flat as in Example 2. This glass has a softening point of 50° C. The principal absorption band is at about 13 microns.

Example 7

80.00 grams of pure selenium were melted and refluxed with 20 grams arsenic triselenide under a vacuum of a few millimeters and made into a preform. This glass has a softening point of about 79° C. The refractive index at 2 microns is 2.48.

Example 8

84.00 grams of pure selenium were melted and refluxed under vacuum of a few millimeters with 8.00 grams of pure arsenic metal and 8.00 grams of thallic telluride. The melt was poured into a mold and the lens blank polished. This glass has a softening point of 70° C. and has less than 1% transmission from 0.5 to 2.6 microns for 2 mm. thick samples.

Example 9

80 grams of pure selenium were melted with 20 grams of arsenic tritelluride under a vacuum of a few millimeters. The melt was made into a preform. This glass has an absorption edge at 1.1 microns.

Example 10

88 grams selenium and 4 grams thallic selenide were melted with 8 grams arsenic metal to form a glass. When made into an optical flat, this glass had an absorption edge which begins at 4 microns and reaches the peak of its slope at about 8 microns. This glass has a softening point of 65° C., a refractive index of 2.63 at 2 microns, and less than 1% transmission from 0.5 to 4 microns for 2 mm. thick samples.

Example 11

80 grams of selenium and 10 grams of lead telluride and 10 grams of arsenic metal were melted together under a vacuum and made into preform. The preform is pressed into a finished lens. The transmission of this glass is less than 1% from 0.5 to 15 microns for 2 mm. thick samples.

Example 12

70 grams of selenium, 15 grams of thallium metal and 15 grams of arsenic triselenide were melted together under a vacuum. This glass when made into a lens had less than 1% transmission of 0.5 to 15 microns for 2 mm. thick samples.

Example 13

80 grams of selenium and 20 grams of thallic arsenide were melted together under a vacuum and made into a lens blank. The polished lens had less than 1% transmission from 0.5 to 15 microns for 2 mm. thick samples.

Example 14

80 grams selenium and 20 grams thallous arsenide were melted together. The resulting glass has less than 1% transmission from 0.5 to 15 microns for 2 mm. thick samples.

As stated above, the various glasses of this invention have desirable transmission characteristics in the infrared spectrum, desirable indices of refraction, as well as improved thermal stability and aging properties, and this invention thus provides interesting and valuable contributions to the art.

We claim:

1. An optical glass composition consisting essentially of approximately 47% to 92% by weight of selenium, the remaining percent by weight of the composition being made up of a member selected from the group consisting of As, As—Te, As—Te—S, Te—P, and $As_2Te_3$—Tl.

2. An optical glass consisting essentially, in percent by weight, of 47.8% selenium, 47.8% tellurium and 4.4% arsenic.

3. An optical glass consisting essentially, in percent by weight, of 47% selenium and 47% tellurium and 6% phosphorous.

4. An optical glass consisting essentially, in percent by weight, of 84% selenium, 8% arsenic and 8% thallic telluride.

5. An optical glass consisting essentially, in percent by weight, of 70% selenium, 15% arsenic triselenide and 15% thallium.

References Cited in the file of this patent

UNITED STATES PATENTS

| | | |
|---|---|---|
| 2,439,290 | Fetterley | Apr. 6, 1948 |
| 2,873,198 | Goliber | Feb. 10, 1959 |
| 2,883,293 | Jerger et al. | Apr. 21, 1959 |

OTHER REFERENCES

Grison: J. of Chem. Physics, vol. 19, #9, pp. 1109–1113.

Properties of Glass, by Morey, 1938, pp. 173, 174, 176, 529 and 530.

Silica and the Silicates, pp. 277 and 316, by Audley, 1921.

Journal of Soc. of Glass Tech., Series 2, 90, 1918, Series 3, 125, 1918.

Adams: Jour. Franklin Ins., vol. 39, 1933, p. 174.

Glass: The Miracle Maker, 2d ed. (1948), pp. 154, 190 and 191.

Glass, by G. O. Jones (1956), p. 8.